Figure 1:
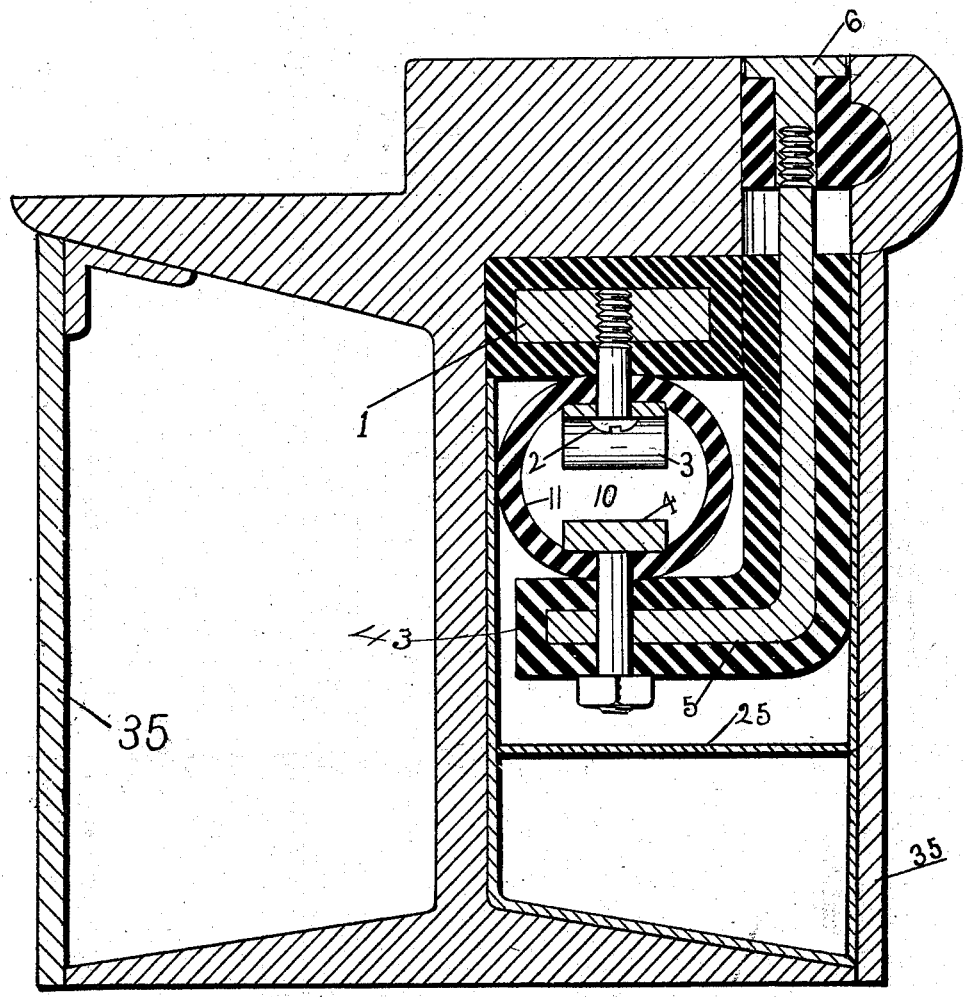

(No Model.) 10 Sheets—Sheet 1.

H. BRANDENBURG.
ELECTRIC RAILWAY.

No. 562,453. Patented June 23, 1896.

Witnesses
Wm. A. Youmans.
H. deGrey.

Inventor
Henry Brandenburg (No Model.) 10 Sheets—Sheet 3.

H. BRANDENBURG.
ELECTRIC RAILWAY.

No. 562,453. Patented June 23, 1896.

Witnesses
Wm. A. Youmans.
H. deLrey

Inventor
Henry Brandenburg (No Model.)
10 Sheets—Sheet 5.

H. BRANDENBURG.
ELECTRIC RAILWAY.

No. 562,453. Patented June 23, 1896.

Witnesses
Wm A Youmans.
H. de Grey

Inventor
Henry Brandenburg (No Model.) 10 Sheets—Sheet 6.
H. BRANDENBURG.
ELECTRIC RAILWAY.
No. 562,453. Patented June 23, 1896.
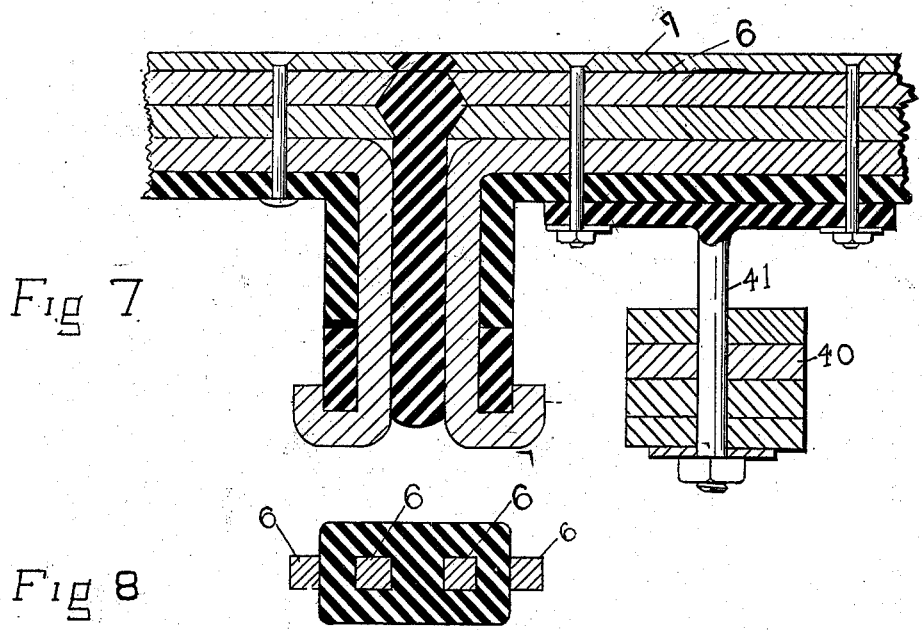
Fig 7
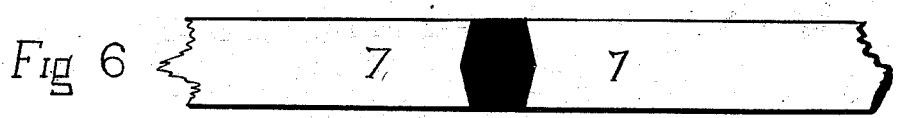
Fig 8
Fig 6
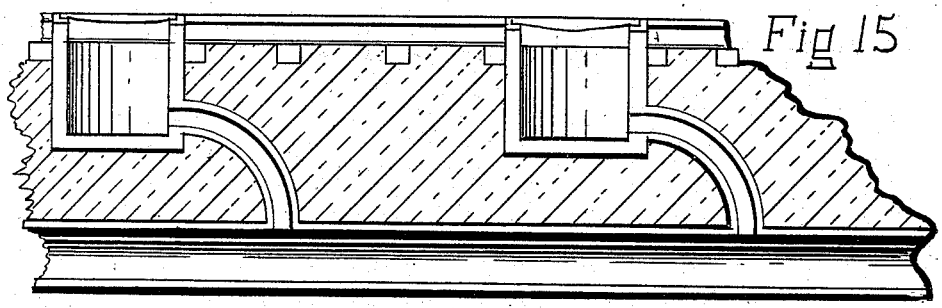
Fig 15
Witnesses:
Wm. A. Youmans.
H. de Grey.
Inventor
Henry Brandenburg (No Model.) 10 Sheets—Sheet 7.
H. BRANDENBURG.
ELECTRIC RAILWAY.

No. 562,453. Patented June 23, 1896.

Witnesses
Inventor
Henry Brandenburg

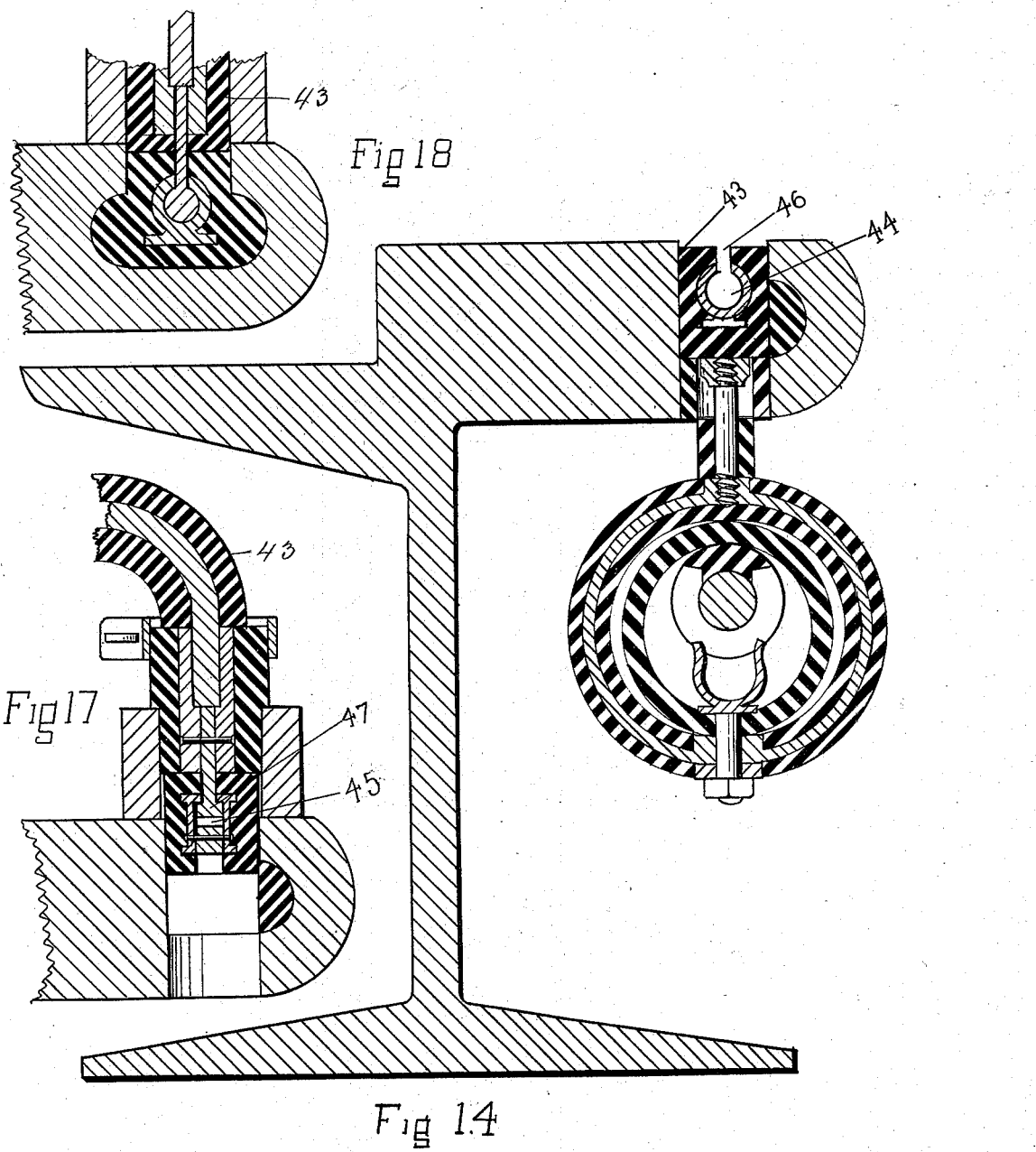

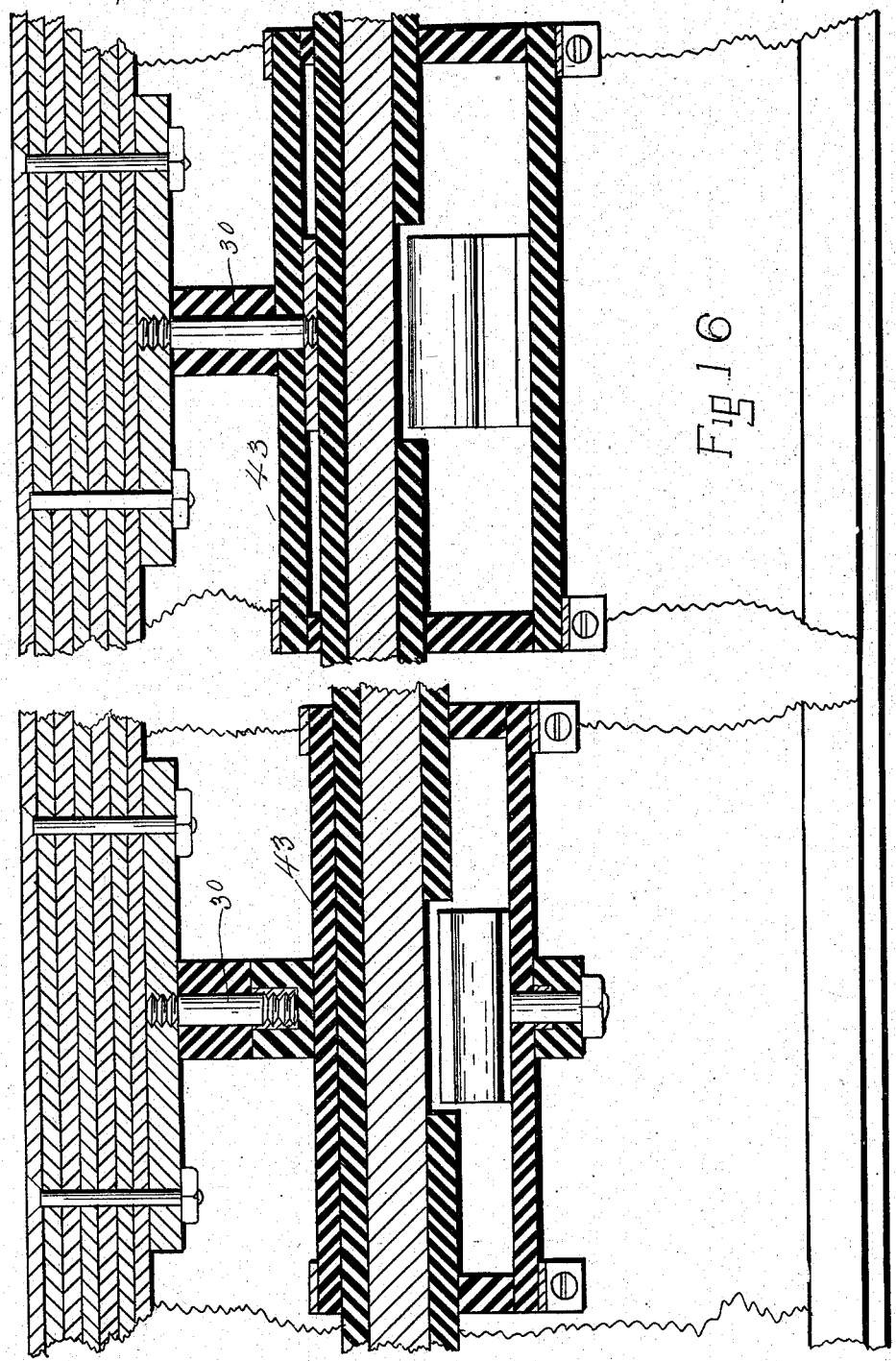

UNITED STATES PATENT OFFICE.

HENRY BRANDENBURG, OF CHICAGO, ILLINOIS.

ELECTRIC RAILWAY.

SPECIFICATION forming part of Letters Patent No. 562,453, dated June 23, 1896.

Application filed March 11, 1895. Serial No. 541,383. (No model.)

*To all whom it may concern:*

Be it known that I, HENRY BRANDENBURG, a citizen of the United States, residing at Chicago, Illinois, have invented certain new and useful Improvements in Electric Railways, of which the following is a specification.

My invention relates to electric railways which employ mechanical devices to make electrical connections between an electric motor in cars or vehicles and a continuous main conductor near to or under the cars or vehicles, and preferably attached to the rail on which the cars run; and it consists of certain novel features of construction, whereby simplicity, economy, durability, and ready access for replacing and repairing the various parts are secured and at the minimum cost for constructing and operating.

The invention further consists in certain novel features of construction, whereby the system may be applied readily to any railroad, and operated in all conditions of climate, without undue loss or leakage of the electrical current.

I do not limit my invention to the precise form or details, nor to the relative arrangement of parts as shown in the drawings, as they may be modified without departing from the spirit of my invention, in order to apply my system to the various forms of rails in use upon the lines adopting it.

To attain the object of my invention, I avoid the use of costly conduits, and utilize, preferably, the rail, upon which the cars run along, where there is less apt to be an accumulation of water, dirt, snow, and ice, and where such accumulations are more readily disposed of.

In carrying my invention into practice I make use of mechanical devices to make electrical connections between the main continuous conductor and the electric motor in the car or vehicle, and by using a high grade of insulation I reduce the grounding of the electric current to a minimum.

Figure 2:
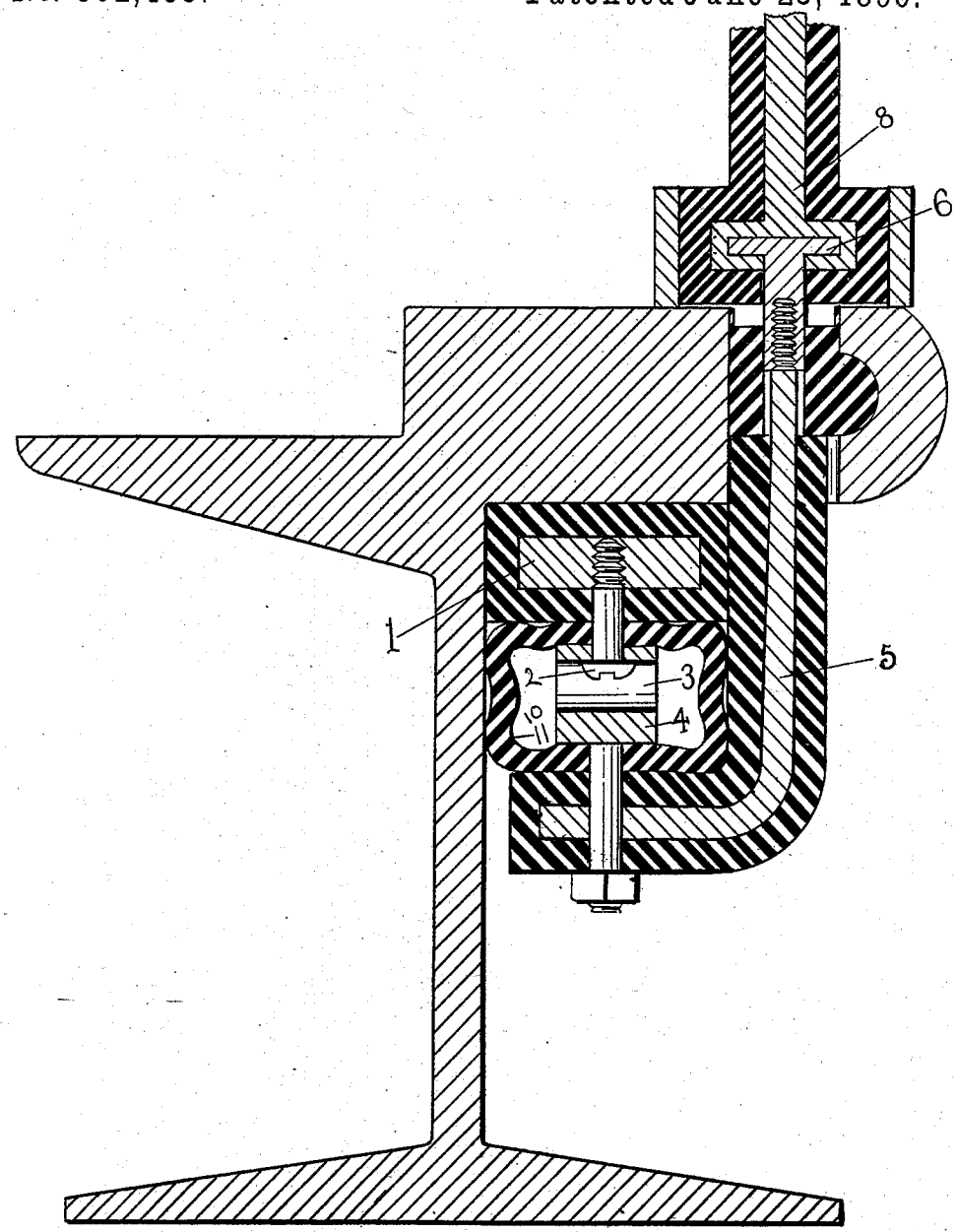
Figure 3:
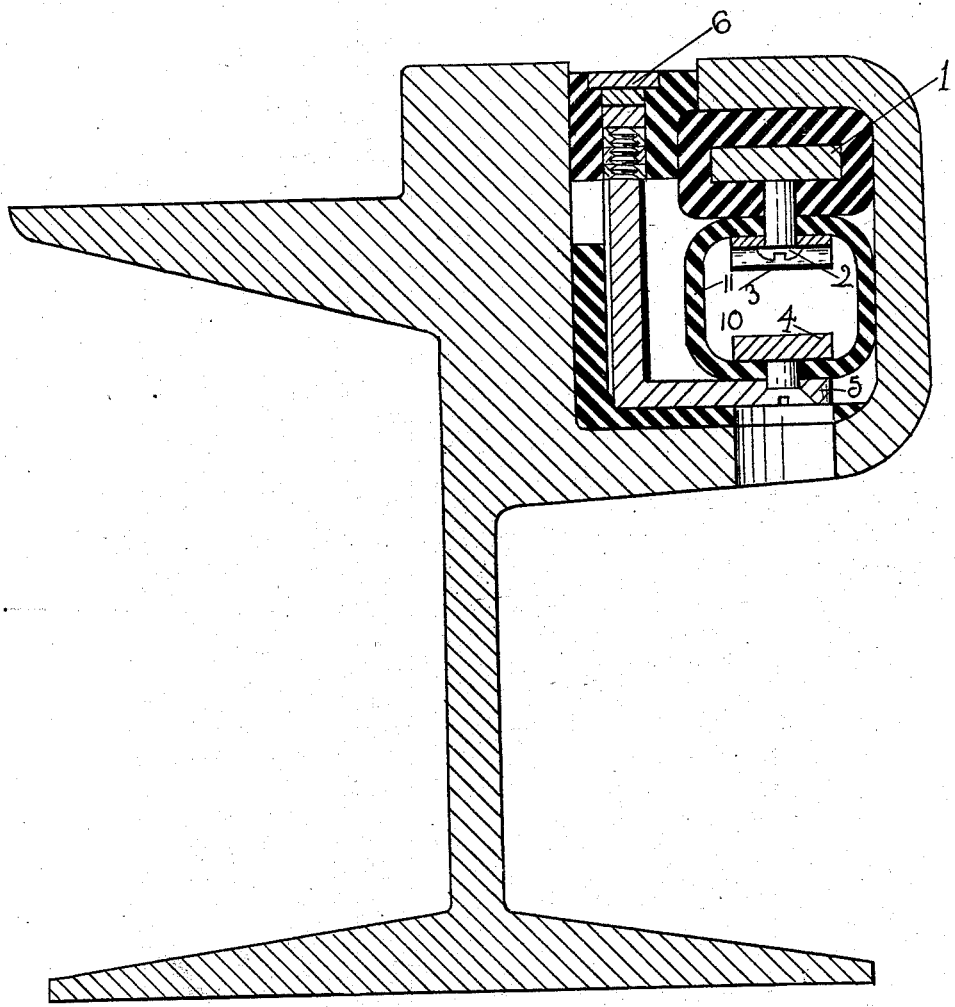
Figure 4:
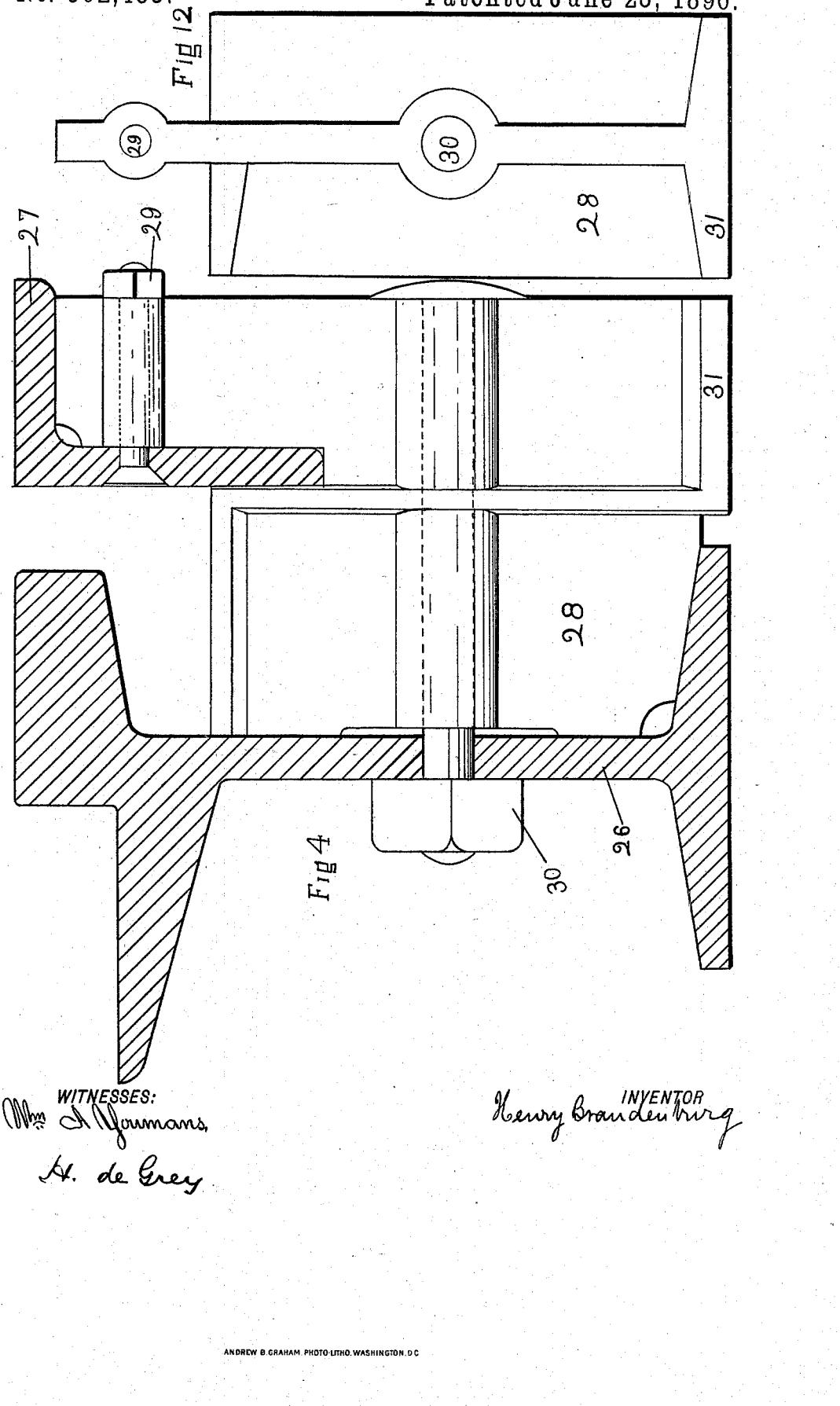
Figure 5:
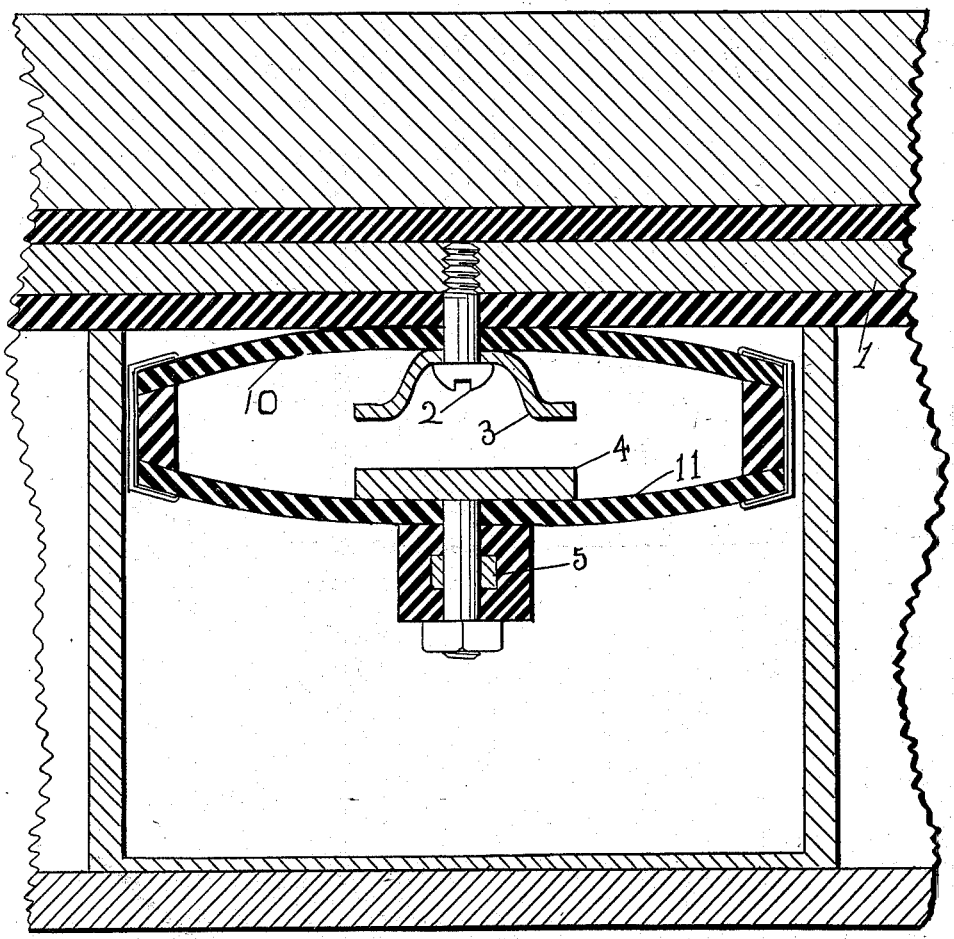
Figure 9:
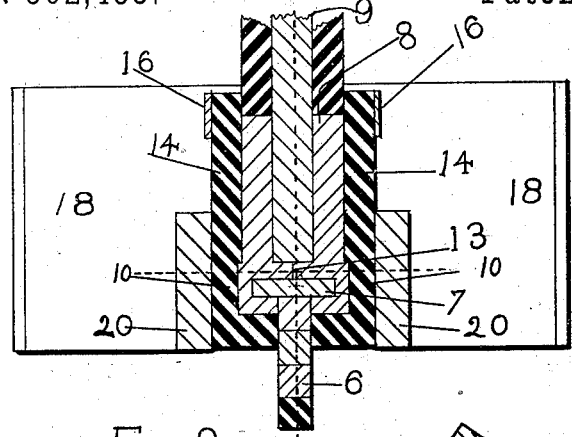
Figure 10:
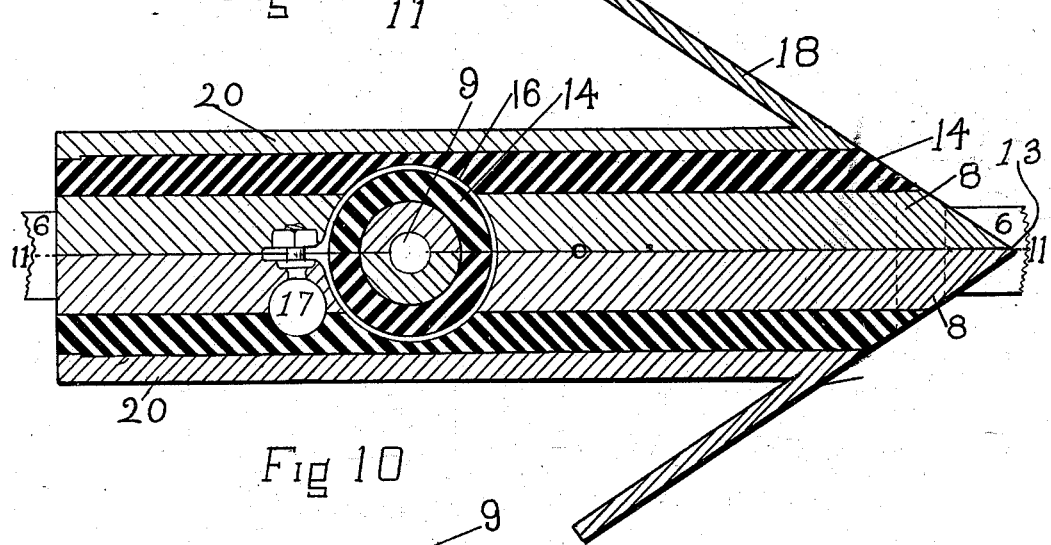
Figure 11:
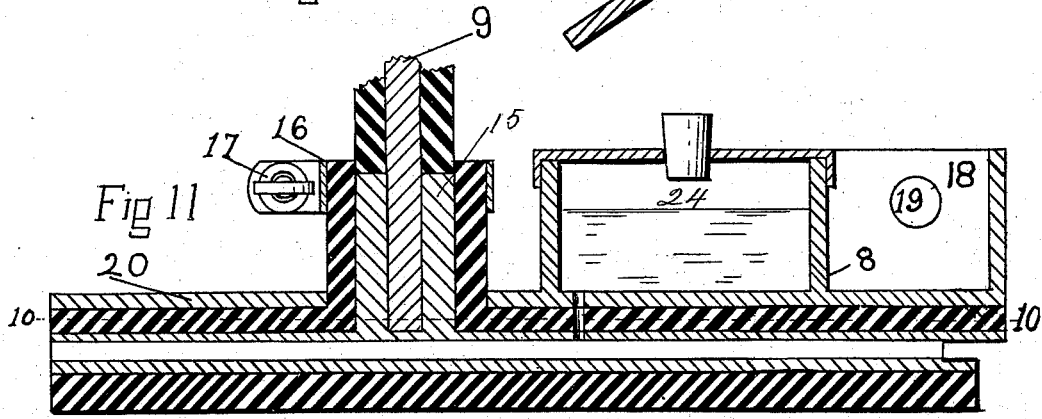
Figure 13:
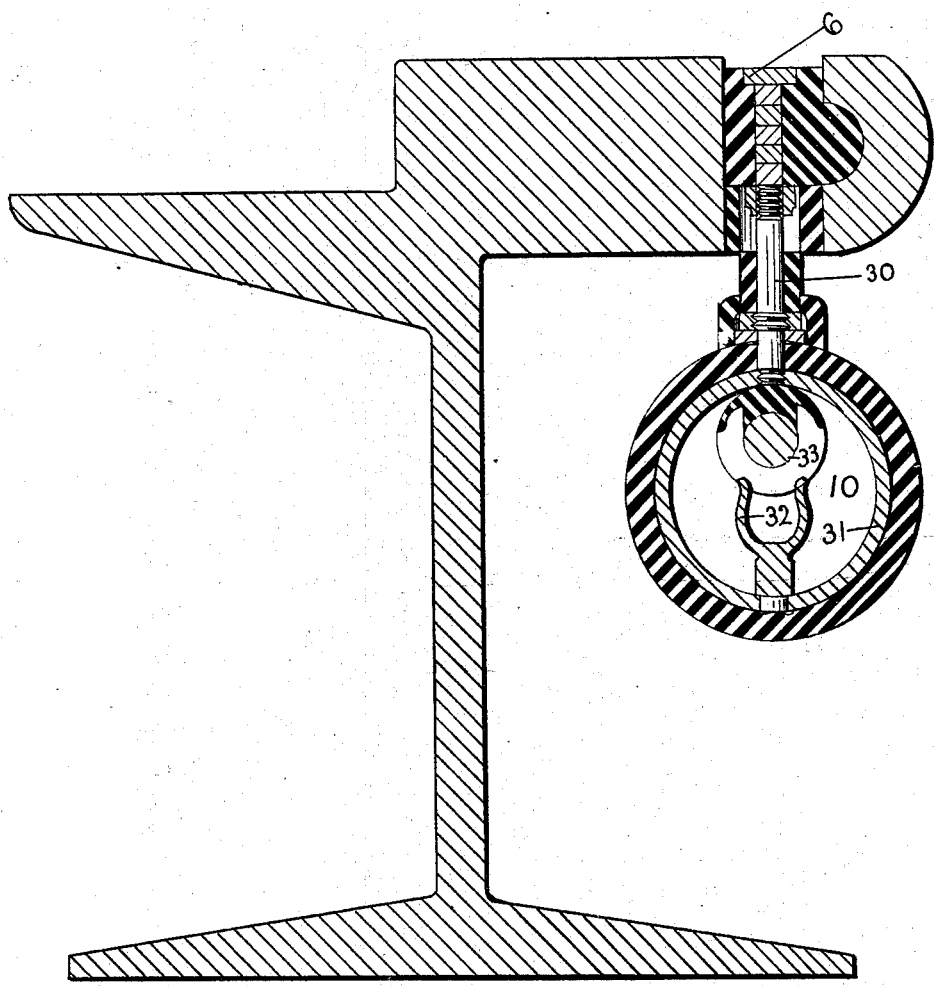

By reference to the drawings, Figure 1 represents my special rail with the sectional and main continuous conductor out of contact. Fig. 2 is the same in contact with the sliding contact in connection. Fig. 3 presents a modification of the form of the rail for the purpose of containing the working appliances. Fig. 4 presents a modification showing the application of the working system to the ordinary form of rail in use on street-railways. Fig. 5 shows a lateral section through the conductor and ball or bulb with their attendant connections. Fig. 6 is a top view of the surface-strip of sectional contact-bar. Fig. 7 is a section of the end connections of the sectional conductors. Fig. 8 is a horizontal section of same at 9 9. Fig. 9 is a transverse section of the sliding contact or trolley at 9 9. Fig. 10 is a horizontal section of same at 10 10. Fig. 11 is a lateral section of same at 11 11. Fig. 12 is an end view of the metal separator or bracket attached to Fig. 4. Fig. 13 is an end section showing stirrup action outside of flexible bulb. Fig. 14 is same with the stirrup within the flexible bulb. Fig. 15 shows the method of removing water accumulations. Fig. 16 represents two forms of bulbs with the main conductor passing through them. Fig. 17 represents a cross-section of a sliding trolley grasping a main continuous or sectional tubular channel-conductor inclosed in elastic insulation set in a grooved rail. Fig. 18 represents a main continuous tubular conductor permanently located in insulation, with sectional view of trolley in place.

To enable those skilled in the arts to properly construct and operate my invention, I invite attention to a more detailed description of the structure and appliances by reference to the numbers and figures. The function of the rails and their appliances is self-evident. The continuous conductor 1, Figs. 1 to 5, is connected electrically when in contact through the screw-pin 2, Figs. 1 to 5; the spring-contact 3, Figs. 1 to 5; the contact-bolt 4, Figs. 1 to 5; thence via the hook or stirrup 5, Figs. 1 to 5, through the contact-bar or sectional conductor 6, Figs. 1 to 10, except 5, and the contact metal 7, Figs. 9 to 11, in the contact slide or trolley 8, Figs. 2 and 9 to 11, to the wire conductor 9, Figs. 8 to 11; thence to the motor.

The contact-pin 2, Figs. 1 to 5, operates to attach the flexible ball or bulb 10, Figs. 1 to 5, in an air and water tight manner (as far as possible) to the conductor 1, Figs. 1 to 5, by compression between the contact-spring 3, Figs. 1 to 5, and the insulation of the main conductor. The walls 11 of the ball or bulb 10, Figs. 1 to 5, are composed of flexible insulation material capable of compression, as shown in Fig. 2. The contact-bolt 4, Figs. 1 to 3, similarly compresses the lower walls of the ball or bulb between its head and the stirrup or hook, and is secured thereto in manner shown.

The stirrup, Figs. 1 to 5 and 14, serves to form a medium of electrical and mechanical connection between the conductor in the ball or bulb 10, Figs. 1 to 5, and the contact-bar, or sectional conductor, and the contact-bar 6, Figs. 1 to 10, except 5, and is of metal, insulated, and is firmly and electrically attached to said sectional conductor, and if found necessary to successfully disconnect from the main conductor weights on the bottom of the sectional conductors are attached, as shown in Fig. 7, 40 being the weights, 41 the attachment to sectional conductor.

The sectional conductor 6, Figs. 1 to 10, except 5, is made of a series of metal bars or small strips of metal riveted together where necessary, and capped with a wider piece, which may be further protected by a cap of insulation or electrically disconnected from the metal below. This sectional conductor works between two strips or blocks of insulation, which are continuous as shown in 12, Figs. 1, 2, 3, and 4, and during action is lifted by the trolley, Figs. 2, 9, and 10, which is in sections of moderate length and united at the ends by insulation in manner shown in Figs. 6, 7, and 8. When at rest, it lies in the trench, trough, or groove of insulation and is electrically disconnected from both main conductors and motor in the car; or a modification similar to that shown in Figs. 14 and 17, in which a sectional or continuous conductor, consisting of a slotted tube of metal inclosed in elastic insulation, which, in case of sectional conductor, is lifted by the traveling trolley, as shown in Fig. 17. If not used as sectional conductor to make contact with other conductor, it will remain immovable in the slot or chamber, and the sliding contact-bar in the traveling trolley is lowered to avoid the lifting, as shown.

The trolley or traveling transmitter, Figs. 2, 9, 10, and 11, is sectional internally, being divided perpendicularly and laterally and surrounded, except on the bottom and partially on the ends, by a metal casing, preferably brass. The contact-plates 8, Figs. 9 to 11, contain a groove on the inner or junction side 13 for the reception of the sectional conductors 6, Figs. 1 to 10, except 5. This metal rests in a similar block of insulation 14, Figs. 9 to 11, and has a divided riser or column 15 rising a short distance above the top of the body of the trolley, and also inclosed in insulation. A core in the center allows the introduction of the electric wire 9, Figs. 9 to 11, which is clamped to the trolley by the flange-ring 16, Figs. 9 to 11, which is compressed by the thumb-screw 17, Figs. 10 and 11. A clearing-plow 18, Figs. 9 to 11, perforated by a cable-hole 19, Figs. 9 to 11, through which the cable for towing is attached to the car, (not shown in drawings,) passes, from the front of the trolley behind which is a cavity for holding lubricating-oil 24, Fig. 11, which by appropriate oil-holes passes down to the slot to lubricate the contact portions of the traveling trolley. The metallic case of the trolley 20, Figs. 9 to 11, covers each side and the top of the trolley, and acts as the runners or slides for it.

Where the modification shown in Figs. 14 to 17 is used, the elastic insulation 43, Figs. 14 to 17, when the conductor is out of contact, closes at the slot-entrance to the hollow conductor 44, Fig. 14, and 45, Fig. 17, making a practically dirt and water proof joint when in contact. It is operated by the traveling contact metal 46 and 47, in same figures. The car-wheels may assist in closing by pressure thereon, all of which is used either for sectional or continuous metal conductors contained within the elastic insulation 43, Figs. 14 and 17. If a continuous conductor is used, then the appliances as used to connect other continuous conductors are not necessary.

The operation of the appliance for transmission of current is accomplished by the trolley or transmitter lifting the sectional conductors with their connected stirrups or hooks, thus compressing the bulb or ball and bringing the bolt-heads and spring-contacts within the bulb or ball in contact, as shown, and causing the passage of the current between the main conductor and motor in the car or vehicle. The contact is released when the trolley or transmitter passes on a short distance and by the natural elasticity of the walls of the bulb or ball, the weight of the sectional conductors and weights attached thereto disconnects the electrical current.

The working appliances outside of the chamber in the rail are protected from water, &c., by a metal casing 25, Figs. 1 to 13.

The action of the appliances where the stirrup is used instead of a hook is shown in Figs. 13 and 14, and the relative position of the conductor and ball or bulb being changed from that shown in Figs. 1 to 4, and a round conductor used instead of a flat one, and it passing through the bulb, so direct connection with the bolt without the intervention of the spring attachment to the conductor is made. The spring is, however, made a portion or washer to the bolt itself.

In Fig. 3 I present a sectional view of one of the standard girder-rails with attachments designed so the working appliances of my invention may be placed therein, 26 being a rail, 27 a continuous exterior guard and lip to the slot or cavity, resting on and bolted to the occasional bracket or separator 28, Figs. 5 to 12, by the bolt 29. The bracket is bolted to the web of the rail 26 by the bolt 30, and outside of the flanges of the rail has a foot-flange 31 to rest on a tie. A perpendicular flange 32 affords a rest for a guard extending from one bracket to the other, (which is not shown in the drawings.)

By reference to Fig. 13 a modification of the system is observable, a stirrup being used instead of a hook. In this case the shank of the stirrup 30 descends from its connection with the sectional conductor 6, and, passing through the walls of the bulb 10, screws into the metal ring within it 31. To the lower rim of the ring is attached the spring-contact 32, which is lifted to form a sliding electrical contact with the conductor 33 when the trolley or transmitter passes over and thrown out of contact by the dropping of the stirrup. A thread is worked on the lower end of the shaft, and a nut pressing down on a washer renders the joint between the shank and the flexible bulb practically air and water tight. A modification is also exhibited in Fig. 14, where the stirrup is outside of the walls of the flexible bulb and attached thereto electrically the same as in Fig. 1.

For the preventing of accumulation of water around the rail and the appliances, I place a casing-wall of metal or other material on both sides of the rail, which also serves as a support to the rail and appurtenances attached thereto, and forming a trough running to outlets in catch-basins located at short intervals along the line, which are connected with the street or other drains at lower levels, and having manholes with covers for admitting the introduction of cleaning implements, as shown in Fig. 15, the walls being also shown in 35, Fig. 1.

Having thus described my invention, what I claim as new, and desire to secure by Letters Patent, is—

1. In an electric railway, the combination with a rail, a feed-conductor supported below the level of the face of the rail, and a continuous vertically-movable conductor on which the trolley runs formed in insulated sections supported above the level of the feed-conductor, and below the level of the top of the rail, but adapted to be elevated above said face of contacts located below the feed-conductor with connections between said contacts and conductor on which the trolley runs whereby when the said conductor is elevated the contacts are moved into electrical connection with the feed-conductor; substantially as described.

2. In an electric railway, the combination with the flanged rail and a continuous feed-conductor located below the level of said flange, of a vertically-movable continuous conductor on which the trolley runs formed in insulated sections supported by the rail above the level of the feed-conductor, contacts lying in proximity to the feed-conductor and electrical and mechanical connections between the trolley-conductor and contacts passing through the rail-flange, whereby when said trolley-conductor is lifted, electrical connection will be established between the same and the feed-conductor; substantially as described.

3. In an electric railway, the combination with the rail having the perforated laterally-extending flange, the feed-conductor located below said flange and movable contacts in proximity to said feed-conductor, of the sectional conductor on which the trolley runs supported by the flange and electrical and mechanical connections between the last-mentioned conductor and contacts, passing through the perforations in the flange; whereby when the said conductor is moved the contacts will be thrown into electrical connection with the feed-conductor; substantially as described.

4. In an electric railway the combination with the rail having the laterally-extending flange and the feed-conductor located beneath said flange, of the vertically-movable contacts supported below the conductor, the continuous conductor on which the trolley runs formed in insulated sections mounted on the flange and the insulated mechanical and electrical connection extending from the conductor on which the trolley runs through the flange and constituting the support for the contacts whereby when said conductor is moved the contacts will be thrown into electrical connection with the feed-conductor; substantially as described.

5. In an electrical railway the combination with the substantially I-shaped rail having the integral laterally-extending and longitudinally recessed or channeled flange on one side of the head of the trolley-conductor seated in and closing said longitudinal recess or channel; substantially as described.

6. In an electric railway, the combination with the rail having the integral laterally-extending longitudinally recessed or channeled flange, of the continuous trolley-conductor supported in and closing said recess or channel with insulation interposed between the conductor and flange for preventing electrical connection between the rail and trolley-conductor; substantially as described.

7. In an electric railway, the combination with the rail having the laterally-extending longitudinally recessed or channeled flange, of the movable continuous conductor on which the trolley runs supported in and substantially filling said recess or channel, a feed-conductor and contacts for establishing the electrical connection between the conductor and feed-conductor thrown into operative contact by the movement of the trolley-conductor; substantially as described.

8. In an electric railway, the combination with the feed-conductor located below the level of the rail and contacts in proximity to the feed-conductor, of a sectional trolley-conductor and trolley coöperating therewith, said trolley-conductor and trolley having interlocking or undercut parts, whereby they are held against lateral movement with relation to each other, the trolley-conductor being located at approximately the level of the rail and electrical connections between the trolley-conductor and contacts; substantially as described.

9. In an electric railway, the combination with the feed-conductor and contacts located in proximity thereto, of the vertically-movable trolley-conductor supported at approximately the level of the rail, the coöperating trolley said trolley and trolley-conductor having coöperating interlocking parts whereby lateral movement one with relation to the other is prevented and electrical and mechanical connections between the trolley-conductor and contacts whereby when the trolley-conductor is elevated electrical connection will be established between the same and feed-conductor; substantially as described.

10. In an electric railway, the combination with the rail the feed-conductor and contacts adapted to establish electrical connection therewith, of the vertically-movable sectional trolley-conductor having the lateral extensions or headed in cross-section, with electrical and mechanical connections between the trolley-conductor and contacts and a trolley having coöperating contact-plates fitting around the lateral extensions on the trolley-conductor, whereby the trolley-conductor may be moved vertically by the trolley without disturbing the electrical connections between the same; substantially as described.

11. A rail formed in one piece for use in connection with electrical railways consisting of the web having the bottom supporting-flange, top supporting-flange for the wheel, said top flange having a longitudinal recess or channel for the reception of the trolley-conductor and an independent depression or recess for the wheel-flange; substantially as described.

12. In an electrical railway, the combination with the movable trolley-conductor having the lateral flanges, of the trolley having contact-faces with flanges adapted to take under the flanges on the trolley-conductor; substantially as described.

13. In an electric railway, the combination with the trolley-conductor having the lateral flanges, of the trolley having contact-plates with edged flanges extending in opposite directions and adapted to take under the flanges; of the trolley-conductor; substantially as described.

HENRY BRANDENBURG.

Witnesses:
WM. A. YOUMANS,
H. DE GREY.